United States Patent
Makiyama et al.

(10) Patent No.: US 6,485,391 B2
(45) Date of Patent: Nov. 26, 2002

(54) CONTROL SYSTEM FOR CONTINUOUSLY VARIABLE AUTOMATIC TRANSMISSION

(75) Inventors: Akihiro Makiyama, Yokohama (JP); Nobuo Kurogo, Kanagawa (JP); Kazuhiko Sugano, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/880,004

(22) Filed: Jun. 14, 2001

(65) Prior Publication Data

US 2001/0056006 A1 Dec. 27, 2001

(30) Foreign Application Priority Data

Jun. 14, 2000 (JP) .................................... 2000-177994

(51) Int. Cl.⁷ ................................................ B60K 41/12
(52) U.S. Cl. ............................ 477/44; 477/46; 477/68
(58) Field of Search ........................ 477/44, 46, 53, 477/68, 120; 701/51, 53

(56) References Cited

U.S. PATENT DOCUMENTS

| | | | | |
|---|---|---|---|---|
| 4,515,040 A | * | 5/1985 | Takeuchi et al. ............ | 477/43 |
| 4,704,683 A | * | 11/1987 | Osanai ........................ | 474/12 |
| 4,727,771 A | * | 3/1988 | Niwa et al. .................. | 477/48 |
| 4,764,155 A | * | 8/1988 | Kumura et al. .............. | 474/12 |
| 5,031,100 A | * | 7/1991 | Takahashi .................. | 477/127 |
| 6,244,986 B1 | * | 6/2001 | Mori et al. .................. | 477/46 |

FOREIGN PATENT DOCUMENTS

JP 4-54371 2/1992

* cited by examiner

*Primary Examiner*—Sherry Estremsky
*Assistant Examiner*—Tisha D. Lewis
(74) *Attorney, Agent, or Firm*—Foley & Lardner

(57) ABSTRACT

A control system for a continuously variable automatic transmission for an automotive vehicle, includes a throttle opening sensor that detects a throttle opening, and a controller that executes a change-speed control in a normal mode in which a desired transmission input speed is determined based on operating conditions of the vehicle and a desired transmission ratio is determined based on the desired transmission input speed when the throttle opening is less than a first value, and that executes the change-speed control in a linear mode in which the desired transmission ratio is fixed to a second value when the throttle opening is greater than or equal to the first value. The second value is set based on the desired transmission ratio used in the normal mode prior to switching to the linear mode.

19 Claims, 12 Drawing Sheets

FIG.3A EXAMPLE OF VOICE OUTPUT

| SWITCHING OF SELECT-LEVER POSITION BY DRIVER | SELECT-LEVER POSITION | VOICE |
|---|---|---|
| R→P | P RANGE | PARKING |
| R→P←N | R RANGE | REVERSE |
| R→N←D | N RANGE | NEUTRAL |
| N→D←2 | D RANGE | AUTO MODE |
| D→2←1 | 2 RANGE | SECOND RANGE |
| 2→1 | 1 RANGE | FIRST RANGE |
| D RANGE →M MODE | M MODE | MANUAL MODE |
| M MODE→D RANGE | D RANGE | AUTO MODE |

FIG.3B EXAMPLE OF VOICE OUTPUT (DURING M MODE)

| GEAR SELECTION BY DRIVER | GEAR | VOICE |
|---|---|---|
| 2→1 | 1ST | FIRST |
| 3→2  1→2 | 2ND | SECOND |
| 4→3  2→3 | 3RD | THIRD |
| 5→4  3→4 | 4TH | FOURTH |
| 6→5  4→5 | 5TH | FIFTH |
| 5→6 | 6TH | SIXTH |

FIG.3C EXAMPLE OF VOICE OUTPUT (DURING M MODE:GEAR SHIFT REJECTION)

| GEAR SELECTION BY DRIVER | GEAR | VOICE |
|---|---|---|
| 1→1  1→2 | 1ST | FIRST |
| 2→1  2→3 | 2ND | SECOND |
| 3→2  3→4 | 3RD | THIRD |
| 4→3  4→5 | 4TH | FOURTH |
| 5→4  5→6 | 5TH | FIFTH |
| 6→5  6→6 | 6TH | SIXTH |

FIG.3D EXAMPLE OF VOICE OUTPUT (DURING M MODE:AUTO SHIFT)

| AUTOMATIC SHIFTING BY AT-CVTCU | GEAR | VOICE |
|---|---|---|
| 2→1 | 1ST | FIRST |
| 3→2 | 2ND | SECOND |
| 4→3 | 3RD | THIRD |
| 5→4 | 4TH | FOURTH |
| 6→5 | 5TH | FIFTH |
| 1→2 | 2ND | SECOND |
| 2→3 | 3RD | THIRD |
| 3→4 | 4TH | FOURTH |
| 4→5 | 5TH | FIFTH |
| 5→6 | 6TH | SIXTH |

FIG.6

|  |  | CURRENT RUNNING MODE | |
|---|---|---|---|
|  |  | NORMAL MODE | LINEAR MODE |
| PREVIOUS RUNNING MODE | NORMAL MODE | Keep | RatioB = Ratio<br>VSPS = VSP |
|  | LINEAR MODE | CLEAR RatioB | Keep |

FIG.7

| RUNNING MODE | ADD PULLEY RATIO OPERATION COEFFICIENT | |
|---|---|---|
| NORMAL MODE | VSPGAIN | RATADDV0 |
| LINEAR MODE A | VSPGAIN (A) | RATADDV0 (A) |
| LINEAR MODE B | VSPGAIN (B) | RATADDV0 (B) |
| LINEAR MODE C | VSPGAIN (C) | RATADDV0 (C) |

CONTROL SYSTEM FOR CONTINUOUSLY VARIABLE AUTOMATIC TRANSMISSION

TECHNICAL FIELD

The present invention relates to a control system for a continuously variable automatic transmission (often abbreviated to "CVT"), and specifically to a continuously variable automatic transmission control system capable of switching a normal mode and a linear mode depending on a throttle opening.

BACKGROUND ART

In recent years, continuously variable automatic transmissions such as a segmented metal drive-belt type continuously variable transmission and a toroidal CVT are often mounted on vehicles. Japanese Patent Provisional Publication No. 4-54371 (hereinafter is referred to as JP4-54371) teaches the control of a continuously variable transmission in which a desired input rotational speed is based on a throttle opening as well as vehicle speed. According to the control disclosed in JP4-54371, when increasing the throttle opening to accelerate the vehicle, the desired transmission input speed tends to increase, thus increasing the transmission, ratio. At this time, there is a slight lag time until the actual transmission ratio begins to increase. For such a slight lag time, the driving force (drive torque) remains unchanged with the rise in transmission input speed substantially corresponding to engine speed. As a result, the driver feels uncomfortable owing to the unintended racing of the engine. To avoid this, U.S. Pat. No. 4,764,155 (corresponding to Japanese Patent No. 2593432) teaches the mode selection from a normal mode to a linear mode triggered by a throttle opening greater than a predetermined threshold value. That is, when the throttle opening is less than the predetermined threshold value, the CVT controller selects the normal mode in which the desired transmission ratio is determined based on engine/vehicle operating conditions such as engine speed and load. When the throttle opening exceeds the predetermined threshold value, the CVT controller selects the linear mode in which a desired transmission ratio is fixed to a certain transmission ratio. During the linear mode, the desired transmission ratio is actually fixed to a transmission ratio retrieved from a preprogrammed change-speed map, just when the throttle opening reaches the threshold. Owing to the transmission ratio fixed by switching to the linear mode, the driving force tends to smoothly increase according to the increase in engine speed. Thus, a time period from a time when the throttle opening starts to increase to a time when the actual acceleration feeling is created is effectively shortened, thereby enhancing the response of vehicle acceleration.

SUMMARY OF THE INVENTION

However, in the transmission control as disclosed in U.S. Pat. No. 4,764,155, when the throttle opening exceeds the threshold at a predetermined vehicle speed and therefore the operating mode is switched to the linear mode, the desired transmission ratio is fixed to a transmission ratio retrieved from the preprogrammed change-speed map just when the throttle opening reaches the threshold, irrespective of the transmission ratio actually used just before the throttle opening begins to increase. Assuming that the transmission ratio actually used just before the throttle opening begins to increase is comparatively large, there is a tendency of insufficient downshifting, thus resulting in a poor acceleration performance. Conversely, assuming that the transmission ratio actually used just before the throttle opening begins to increase is comparatively small, there is a tendency of excessive downshifting, thereby causing undesirable engine-racing feel. When fixing the desired transmission ratio during the linear mode, regardless of three factors, namely the throttle opening, a time rate of change (in particular, a time rate of increase) in the throttle opening, and the vehicle speed, it is difficult to satisfy the acceleration requirement based on the driver's wishes. During the automatic change-speed control, It is desirable to avoid undesired damage to the CVT owing to overspeed of the engine. Recently, there have been proposed continuously variable transmissions having a manual mode in which a predetermined range gear is manually selected. During shifting in the manual mode, when selecting the manual mode, or when releasing the manual mode, it is desirable for the driver to be able to recognize the selected gear at the manual mode, the shift from D range to manual mode, or the shift from manual mode to D range, without seeing an instrument panel or a selector lever.

Accordingly, it is an object of the invention to provide a control system for a continuously variable automatic transmission, which avoids the aforementioned disadvantages.

In order to accomplish the aforementioned and other objects of the present invention, a control system for a continuously variable automatic transmission for an automotive vehicle, comprises a throttle opening sensor that detects a throttle opening, and a controller that executes a change-speed control in a normal mode in which a desired transmission input speed is determined based on operating conditions of the vehicle and a desired transmission ratio is determined based on the desired transmission input speed when the throttle opening is less than a first value, and that executes the change-speed control in a linear mode in which the desired transmission ratio is fixed to a second value when the throttle opening is greater than or equal to the first value, the second value being set based on the desired transmission ratio used in the normal mode prior to switching to the linear mode.

According to another aspect of the invention, a control system for a continuously variable automatic transmission for an automotive vehicle, comprises means for detecting a throttle opening, and a controller that executes a change-speed control in a normal mode in which a desired transmission input speed is determined based on operating conditions of the vehicle and a desired transmission ratio is determined based on the desired transmission input speed when the throttle opening is less than or equal to a first predetermined throttle opening, and that executes the change-speed control in a first linear mode in which the desired transmission ratio is fixed to a predetermined first value preprogrammed to be suitable for a predetermined first acceleration requirement when the throttle opening is greater than a second predetermined throttle opening and less than or equal to a third predetermined throttle opening and a time rate of increase in the throttle opening is less than or equal to a predetermined time rate of increase, and that executes the change-speed control in a second linear mode in which the desired transmission ratio is fixed to a predetermined second value preprogrammed to be suitable for a predetermined second acceleration requirement higher than the predetermined first acceleration requirement when the throttle opening is greater than the second predetermined throttle opening and less than or equal to the third predetermined throttle opening and the time rate of increase in the throttle opening is greater than the predetermined time rate of increase, and that executes the change-speed control in a third linear mode in which the desired transmission ratio is fixed to a predetermined third value preprogrammed to be suitable for a predetermined third acceleration requirement higher than the predetermined second acceleration requirement when the throttle opening is greater than a fourth predetermined throttle opening, the fourth predetermined throttle opening being greater than the third predetermined throttle opening, the fourth predetermined throttle opening being greater than the third predetermined throttle opening being greater than the second predetermined throttle opening being greater than the first predetermined throttle opening, each of the predetermined first, second, and third values being set based on the desired transmission ratio used in the normal mode prior to switching to either of the first, second, and third linear modes.

According to a further aspect of the invention, a method for controlling a continuously variable automatic transmission for an automotive vehicle, the method comprises detecting a throttle opening, determining, based on the throttle opening and a time rate of increase in the throttle opening, whether a running mode is a normal mode, a first linear mode, a second linear mode, or a third linear mode, executing a change-speed control in the normal mode in which a desired transmission input speed is determined based on operating conditions of the vehicle and a desired transmission ratio is determined based on the desired transmission input speed when the throttle opening is less than or equal to a first predetermined throttle opening, executing the change-speed control in the first linear mode in which the desired transmission ratio is fixed to a predetermined first value preprogrammed to be suitable for a predetermined first acceleration requirement when the throttle opening is greater than a second predetermined throttle opening and less than or equal to a third predetermined throttle opening and the time rate of increase in the throttle opening is less than or equal to a predetermined time rate of increase, executing the change-speed control in the second linear mode in which the desired transmission ratio is fixed to a predetermined second value preprogrammed to be suitable for a predetermined second acceleration requirement higher than the predetermined first acceleration requirement when the throttle opening is greater than the second predetermined throttle opening and less than or equal to the third predetermined throttle opening and the time rate of increase in the throttle opening is greater than the predetermined time rate of increase, executing the change-speed control in the third linear mode in which the desired transmission ratio is fixed to a predetermined third value preprogrammed to be suitable for a predetermined third acceleration requirement higher than the predetermined second acceleration requirement when the throttle opening is greater than a fourth predetermined throttle opening, the fourth predetermined throttle opening being greater than the third predetermined throttle opening, the fourth predetermined throttle opening being greater than the third predetermined throttle opening being greater than the second predetermined throttle opening being greater than the first predetermined throttle opening, and setting each of the predetermined first, second, and third values based on the desired transmission ratio used in the normal mode prior to switching to either of the first, second, and third linear modes.

The other objects and features of this invention will become understood from the following description with reference to the accompanying drawings.

BRIEF DESCRIPTION OF THE DRAWINGS

FIGS. 3A–3D are tables showing examples of voice outputs from a speaker.

FIG. 6 is a preprogrammed basic pulley ratio versus standard vehicle speed decision map used in the system of the embodiment.

FIG. 7 is a preprogrammed add pulley ratio operation coefficient selection table used in the system of the embodiment.

DESCRIPTION OF THE PREFERRED EMBODIMENTS

Figure 1:
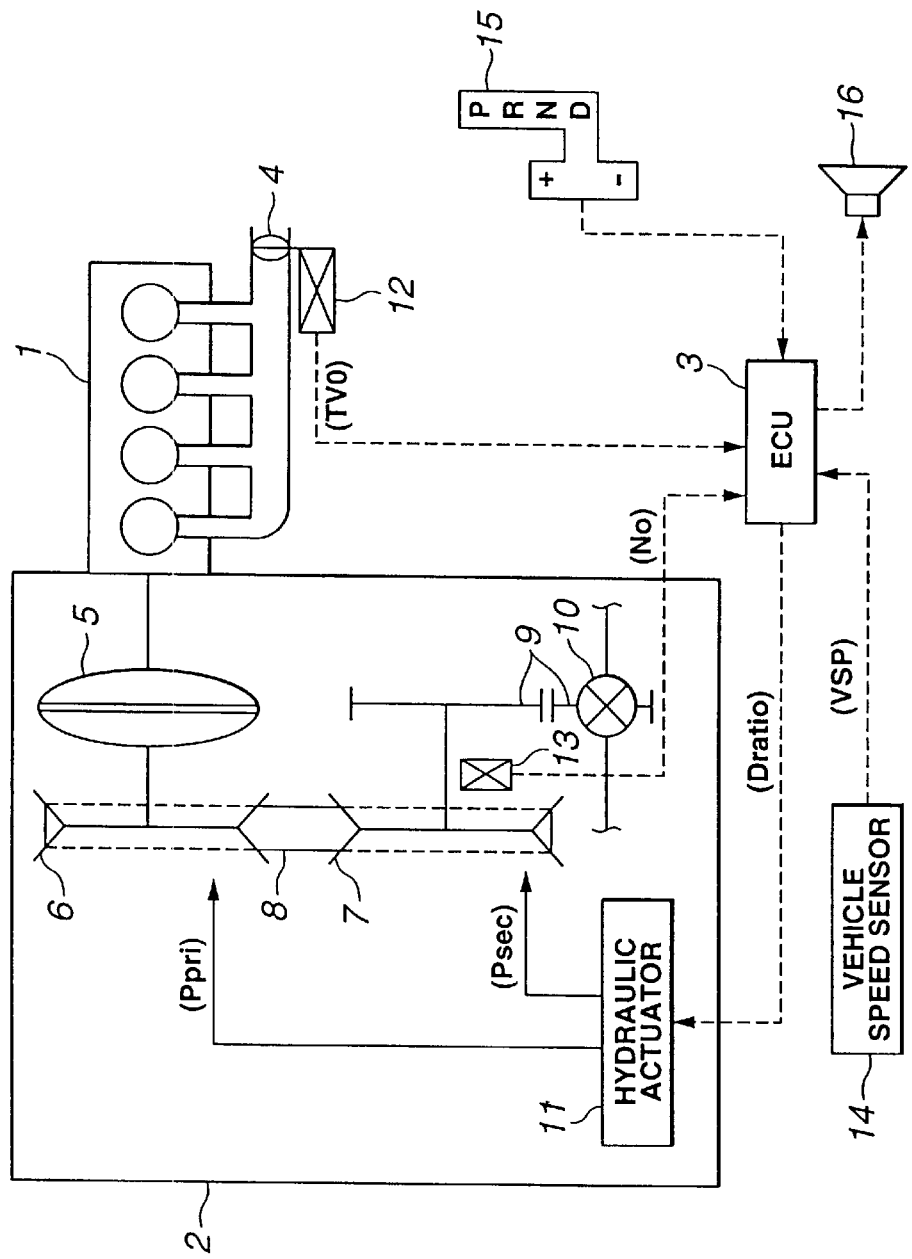
FIG. 1 is a system block diagram illustrating one embodiment of a transmission control system for a continuously variable automatic transmission.
Figure 2:
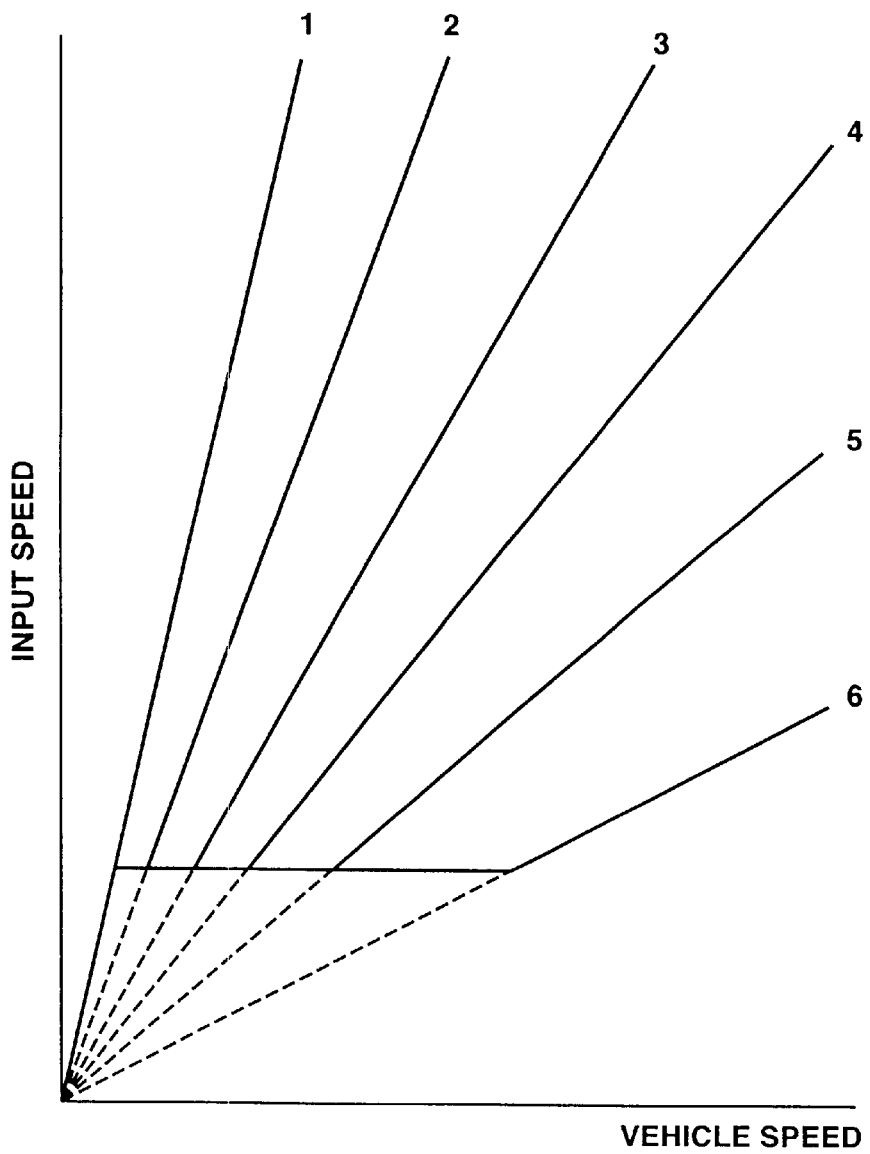
FIG. 2 is a graph illustrating an example of a preprogrammed change-speed line characteristic used at the manual mode.

Referring now to the drawings, particularly to FIG. 1, the transmission control system of the invention is exemplified in a belt type continuously variable automatic transmission. In FIG. 1, reference sign 1 denotes an engine, whereas reference sign 2 denotes a power train constructed mainly by the belt-type continuously variable transmission. Reference sign 3 denotes a CVT controller or a CVT electronic control unit (CVT-ECU). As described later, controller 3 calculates a desired pulley ratio $D_{ratio}$ of the CVT. Engine 1 is equipped with a throttle valve 4 whose opening is determined depending on the degree of driver's accelerator pedal depression. During operation of the engine, air enters each individual engine cylinder through throttle valve 4 and fuel spray is delivered to the engine cylinder. Continuously variable automatic transmission 2 is comprised of a primary pulley 6, a secondary pulley 7, and a V belt (exactly, a segmented steel belt) 8 wound on the primary and secondary pulleys. Primary pulley (driving pulley) 6 is connected via a torque converter 5 to the output shaft of engine 1. The V-groove of secondary pulley (driven pulley) 7 is aligned with the V-groove of primary pulley 6. Secondary pulley 7 is connected via a final drive gear set 9 to a differential gear 10, so as to drive road wheels. In order to steplessly vary a transmission ratio, (a pulley ratio) of CVT 2, the adjustable flanges of primary and secondary pulleys 6 and 7 are designed to slide axially on linear ball bearing splines (not shown), relative to the fixed flanges. Actually, the axial position of the adjustable flange of primary pulley 6 is controlled by a primary pulley pressure $P_{pri}$ produced by means of a hydraulic actuator (or a hydraulic modulator), while the axial position of the adjustable flange of secondary pulley 7 is controlled by a secondary pulley pressure Psec produced by means of the hydraulic actuator (hydraulic modulator). As a result, it is possible to steplessly vary a pulley ratio (a transmission ratio) between the primary and secondary pulleys within limits, so that the pulley ratio is brought closer to the desired pulley ratio $D_{ratio}$. The input/output interface (I/O) of controller 3 receives input information needed to compute the desired pulley ratio $D_{ratio}$. As input information, the CVT-ECU uses various signals from engine/vehicle sensors/switches, namely a throttle opening sensor 12, a transmission output speed sensor 13, a vehicle speed sensor 14, and a selector-lever position switch of a selector lever 15. Throttle opening sensor 12 outputs a signal indicative of a throttle opening TVO. Transmission output speed sensor 13 outputs a signal indicative of a transmission output speed No (corresponding to a rotational speed of secondary pulley 7). Vehicle speed sensor 14 detects a vehicle speed VSP and outputs a signal indicative thereof. Selector-lever position switch of selector lever 15 outputs a signal indicative of a current selector-lever position (selected range). CVT 2 has a manual mode in which a predetermined range gear can be manually selected. In order for the driver to be able to recognize the selected gear at the manual mode, the shift from D range to manual mode, and/or the shift from manual mode to D range without seeing the instrument panel or the selector lever 15 during shifting in the manual mode, when selecting the manual mode, and/or when releasing the manual mode, controller 3 is designed to generate the corresponding voice output by means of a speaker (or a voice production means) 16. FIG. 2 shows the preprogrammed change-speed line used during the manual mode. In FIG. 2, "1" means a 1st gear, "2" means a 2nd gear, "3" means a 3rd gear, "4" means a 4th gear, "5" means a 5th gear, and "6" means a 6th gear. FIGS. 3A through 3D show examples of voice outputs from speaker 16.

Figure 4:
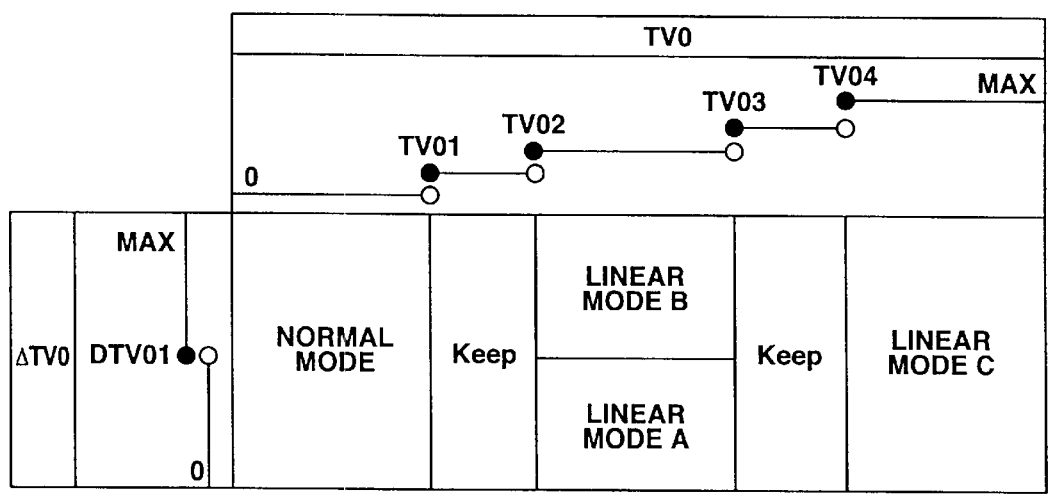
FIG. 4 is a preprogrammed running mode decision map used in the system of the embodiment.
Figure 5:
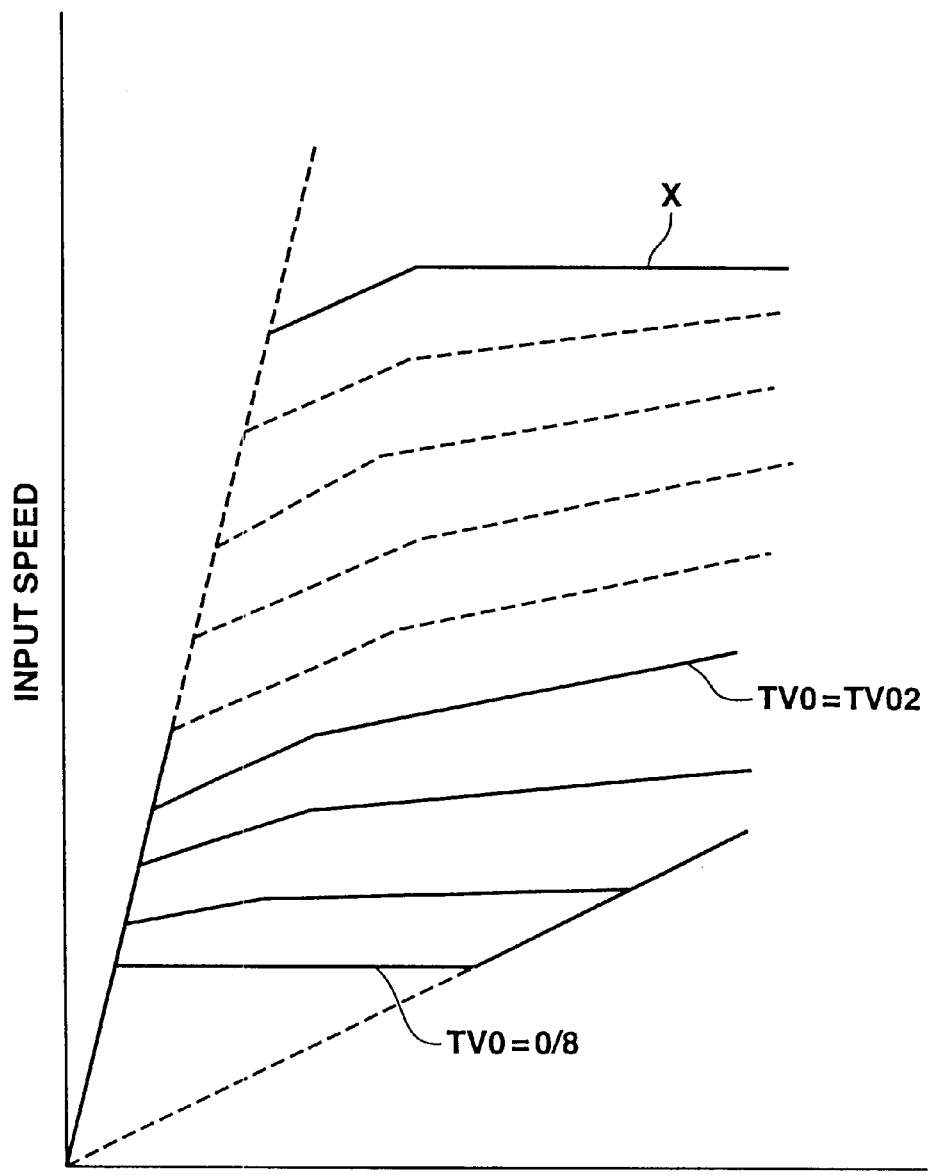
FIG. 5 is a preprogrammed change-speed control pattern used at the normal mode.

Referring now to FIG. 4, there is shown the preprogrammed running mode decision map used by the system of the embodiment in order to determine or decide the running mode based on both the throttle opening TVO and the time rate of increase ΔTVO in the throttle opening. As predetermined control constants for throttle opening TVO, TVO1, TVO2, TVO3, and TVO4 are used (TVO1<TVO2<TVO3<TVO4). As a predetermined control constant for time rate of increase ΔTVO in the throttle opening, DTVO1 is used. For instance, control constant TVO1 is set at 2/8, control constant TVO2 is set at 3/8 or at 5/8, control constant TVO3 is set at 6/8, and control constant TVO4 is set at 7/8. When the throttle opening TVO detected by throttle opening sensor 12 is greater than or equal to "0" and less than or equal to control constant TVO1, that is, in case of 0≦TVO≦TVO1, the normal mode is selected or retrieved from the preprogrammed map of FIG. 4. In the normal mode, the shifting operation is made according to the shift pattern as indicated by the solid line in FIG. 5. The desired input speed (desired primary pulley rotational speed) can be limited to below a limiter X (an upper limit). The limiter X serves to prevent undesirable overspeed of the engine and thus to avoid damage to the CVT. In case of TVO2<TVO≦TVO3 and 0≦ΔTVO≦DTVO1, the linear mode A (corresponding to the small driver's acceleration requirement) is selected or retrieved from the preprogrammed map of FIG. 4. In case of TVO2<TVO≦TVO3 and DTVO1<ΔTVO, the linear mode B (corresponding to the medium driver's acceleration requirement) is selected or retrieved from the preprogrammed map of FIG. 4. In case of TVO4≦TVO, the linear mode C (corresponding to the large driver's acceleration requirement) is selected or retrieved from the preprogrammed map of FIG. 4. In case of TVO1<TVO≦TVO2, and in case of TVO3<TVO≦TVO4, the previous running mode is kept unchanged so as to prevent hunting.

Referring now to FIG. 6, there is shown the preprogrammed basic pulley ratio RatioB versus standard vehicle speed VSPS decision map used by the system of the embodiment. When the previous running mode is the normal mode and the current running mode is either of the linear modes A, B, and C, the basic pulley ratio RatioB is set at the actual pulley ratio Ratio, while the standard vehicle speed VSPS is set at the actual vehicle (speed VSP. Conversely when the previous running mode is either of the linear modes A, B, and C and the current running mode is the normal mode, the basic pulley ratio RatioB is cleared. When the previous running mode is identical to the current running mode, the previous basic pulley ratio and standard vehicle speed are kept unchanged.

Referring now to FIG. 7, there is shown the preprogrammed add pulley ratio operation coefficient selection table used by the system of the embodiment. As add pulley ratio operation vehicle-speed coefficients VSPGAIN, used to compute an add pulley ratio Ratioadd, VSPGAIN(A), VSPGAIN(B), and VSPGAIN(C) are used (VSPGAIN(A)<VSPGAIN(B)<VSPGAIN(C)). As add pulley ratio intercepts RATADDV0 used to compute the add pulley ratio Ratioadd, RATADDV0(A), RATADDV0(B), and RATADDV0(C) are used (RATADDV0(A)<RATADDV0(B)<RATADDV0(C)). Actually, the add pulley ratio Ratioadd is arithmetically calculated or computed from the following expression (1).

$$\text{Ratioadd}=\text{VSPGAIN}(n)\times\text{VSPS}+\text{RATADDV0}(n) \quad (1)$$

where n corresponds to either of A, B, and C, and the equation Ratioadd=VSPGAIN(n)×VSPS+RATADDV0(n) represents the line with a gradient VSPGAIN(n) that cuts the y-axis (i.e., Ratioadd–axis) at the point (0, RATADDV0(n)), and the value RATADDV0(n) is generally called "intercept". As a lower limit for the add pulley ratio Ratioadd computed from the aforementioned expression (1), a predetermined minimum add pulley ratio RATIOADDMIN is defined or set by the following expression (2).

$$\text{Ratioadd}=\text{MAX}(\text{Ratioadd}, \text{RATIOADDMIN}) \quad (2)$$

Figure 8:
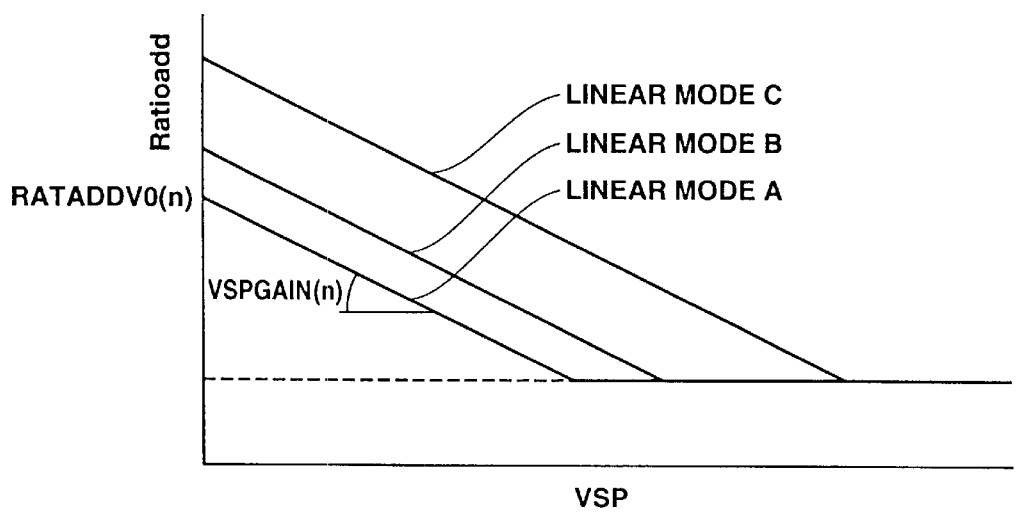
FIG. 8 is a preprogrammed vehicle speed versus add pulley ratio characteristic map.

The relationship between add pulley ratio Ratioadd and vehicle speed VSP, defined or set by the expressions (1) and (2) is clearly shown in FIG. 8. As appreciated from the characteristic map of FIG. 8, the add pulley ratio Ratioadd is set to decrease, as the vehicle speed VSP increases.

On the other hand, the desired pulley ratio $D_{ratio}$ used during the linear mode, is arithmetically calculated or computed by the following expression (3).

$$D_{ratio}=\text{RatioB}+\text{Ratioadd} \quad (3)$$

That is, the desired pulley ratio $D_{ratio}$ is obtained as the sum of basic pulley ratio RatioB and add pulley ratio Ratioadd.

Figure 9:
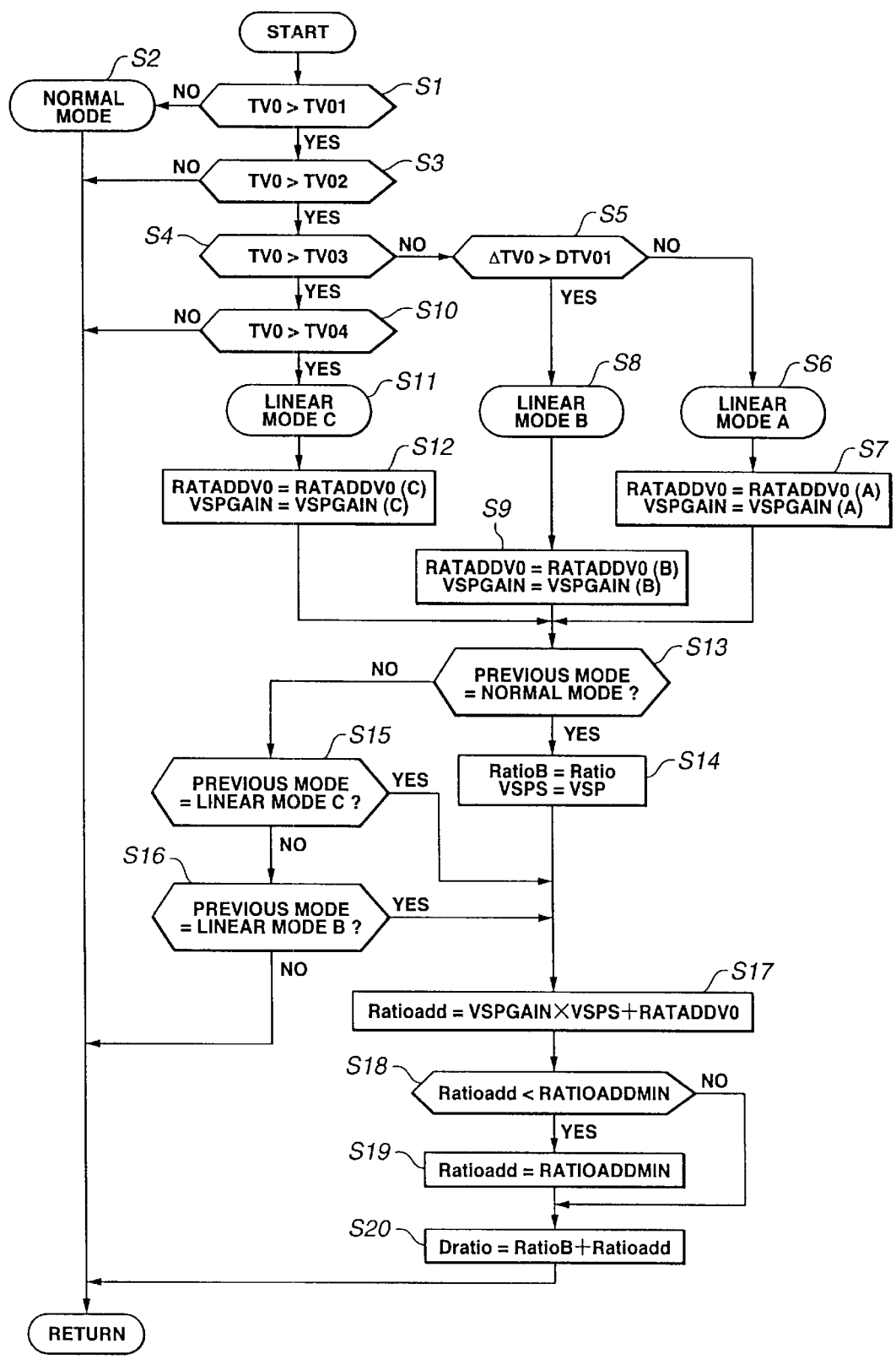
FIG. 9 is a flow chart showing the automatic change-speed control executed by the CVT control system of the embodiment.

Referring now to FIG. 9, there is shown the automatic change-speed control routine executed by the CPU of the CVT controller incorporated in the system of the embodiment. The arithmetic processing or the control routine shown in FIG. 9 is executed as time-triggered interrupt routines to be triggered every predetermined time intervals.

At step S1, a check is made to determine whether throttle opening TVO is greater than control constant TVO1. In case of TVO≦TVO1, the controller determines that the current running mode is the normal mode (see step S2), and thus one cycle of this routine terminates. In contrast, when TVO>TVO1, the routine proceeds from step S1 to step S3. At step S3, a check is made to determine whether throttle opening TVO is greater than control constant TVO2. In case of TVO≦TVO2, one cycle of this routine terminates. Conversely when TVO>TVO2, the routine proceeds from step S3 to step S4. At step S4, a check is made to determine whether throttle opening TVO is greater than control constant TVO3. In case of TVO≦TVO3, the routine proceeds from step S4 to step S5. At step S5, a check is made to determine whether the time rate of increase ΔTVO of throttle opening TVO is greater than predetermined control constant DTVO1. In case of ΔTVO≦DTVO1, that is, when TVO2<TVO≦TVO3 and ΔTVO≦DTVO1, the routine flows from step S5 to step S6. At step S6, the controller determines that the current running mode is the linear mode A (see the map of FIG. 4). Thereafter, at step S7, add pulley ratio operation vehicle speed coefficient VSPGAIN is set at the gain VSPGAIN(A) preprogrammed to be suitable for the linear mode A, and simultaneously add pulley intercept RATADDV0 is set at intercept RATADDV0(A) preprogrammed to be suitable for the linear mode A. Conversely when TVO2<TVO≦TVO3 and ΔTVO>DTVO1, the routine flows from step S5 to step S8. At step S8, the controller determines that the current running mode is the linear mode B (see the map of FIG. 4). Thereafter, at step S9, add pulley ratio operation vehicle speed coefficient VSPGAIN is set at the gain VSPGAIN(B) preprogrammed to be suitable for the linear mode B, and simultaneously add pulley intercept RATADDV0 is set at intercept RATADDV0(B) preprogrammed to be suitable for the linear mode B. Returning to step S4, when the answer to step S4 is affirmative (YES), that is, in case of TVO>TVO3, the routine proceeds to step S10. At step S10, a check is made to determine whether throttle opening TVO is greater than control constant TVO4. In case of TVO≦TVO4, that is, when TVO3<TVO≦TVO4, one cycle of this routine terminates so as to keep the current running mode unchanged. In contrast to the above, in case of TVO>TVO4, the routine proceeds from step S10 to step Sll at which the controller determines that the current running mode is the linear mode C (see the map of FIG. 4). Thereafter, at step S12, add pulley ratio operation vehicle speed coefficient VSPGAIN is set at the gain VSPGAIN(C) preprogrammed to be suitable for the linear mode C, and simultaneously add pulley intercept RATADDV0 is set at intercept RATADDV0(C) preprogrammed to be suitable for the linear mode C. After the properly setting of both the add pulley ratio operation vehicle speed coefficient VSPGAIN and add pulley ratio intercept RATADDV0 through either of steps S7, S9, and S12, step S13 occurs. At step S13, a check is made to determine whether the previous running mode is in the normal mode. When the answer to step S12 is affirmative (YES), and thus the previous running mode is in the normal mode, the routine flows from step S13 to step S14. At step S14, basic pulley ratio RatioB is set at actual pulley ratio Ratio and at the same time standard vehicle speed VSPS is set at actual vehicle speed VSP. Conversely when the answer to step S13 is negative (NO), and thus the previous running mode is out of the normal mode, the routine flows from step S13 to step S15. At step S15, a check is made to determine whether the previous running mode is in the linear mode C. When the answer to step S15 is negative (NO), and thus the previous running mode is out of the linear mode C, the routine proceeds from step S15 to step S16. At step S16, a check is made to determine whether the previous running mode is in the linear mode B. When the answer to step S16 is negative (NO), and thus the previous running mode is out of the linear mode B, one cycle of the routine terminates. After step S14, when the answer to step S15 is affirmative (previous mode=linear mode C), or when the answer to step S16 is affirmative (YES) (previous mode=linear mode B), the routine flows to step S17. At step S17, add pulley ratio Ratioadd is computed from the previously-described expression (1), that is to say, Ratioadd=VSPGAIN(n)×VSPS+RATADDV0(n). Then, at step S18, the computed add pulley ratio Ratioadd is compared to the predetermined minimum add pulley ratio RATIOADDMIN. When the computed add pulley ratio Ratioadd is less than the predetermined minimum add pulley ratio RATIOADDMIN, (Ratioadd<RATIOADDMIN), step S19 occurs. At step S19, the computed add pulley ratio Ratioadd is set at predetermined minimum add pulley ratio RATIOADDMIN. In other words, add pulley ratio Ratioadd is limited by the predetermined minimum pulley ratio RATIOADDMIN. After step S19, step S20 occurs. At step S20, desired pulley ratio $D_{ratio}$ is computed from the previously-described expression (3), that is to say, $D_{ratio}$=RatioB+Ratioadd. When the computed add pulley ratio Ratioadd is greater than or equal to the predetermined minimum add pulley ratio RATIOADDMIN, (Ratioadd≧RATIOADDMIN), the routine jumps from step S18 to step S20. In this manner; one cycle of the control routine terminates.

Figure 10A:
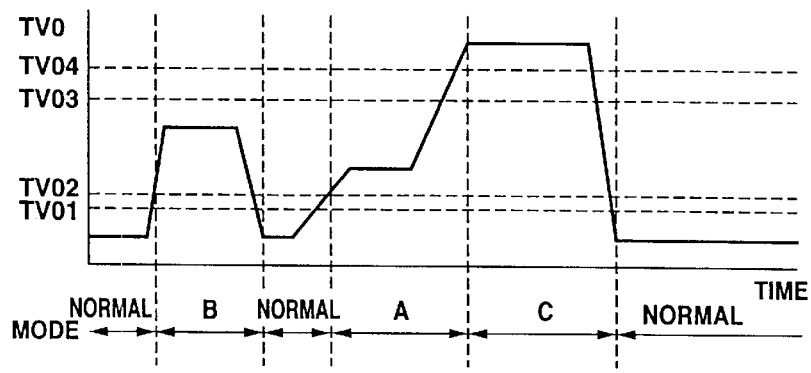
FIGS. 10A–10C are timing charts showing variations in the throttle opening, the desired transmission ratio, and the actual transmission ratio, obtained through the control routine shown in FIG. 9.
Figure 10B:
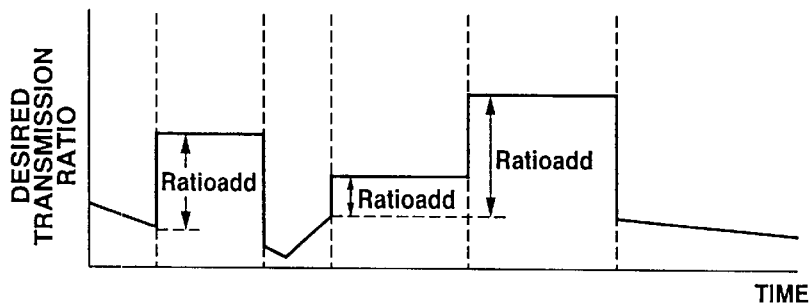
Figure 10C:
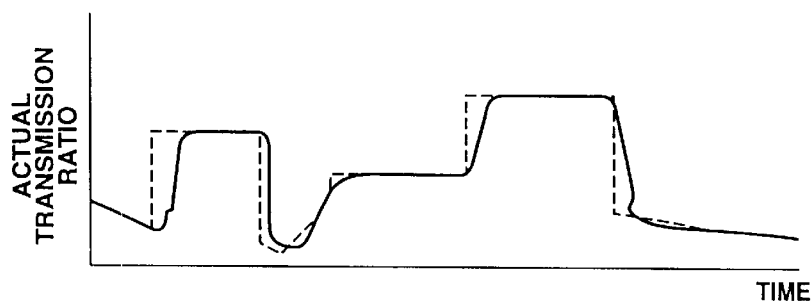
Figure 11A:
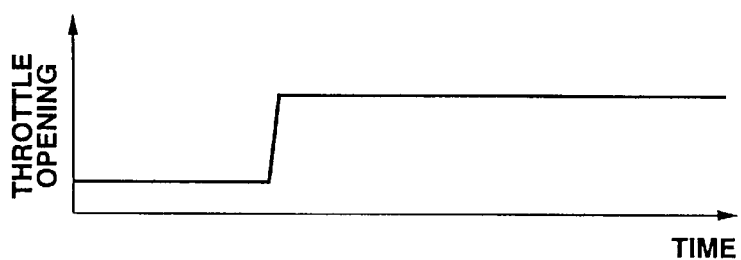
FIGS. 11A–11C are timing charts showing variations in the throttle opening, the transmission output speed, and the vehicle longitudinal acceleration.
Figure 11B:
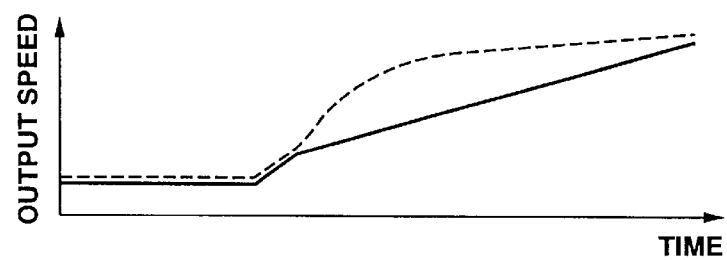
Figure 11C:
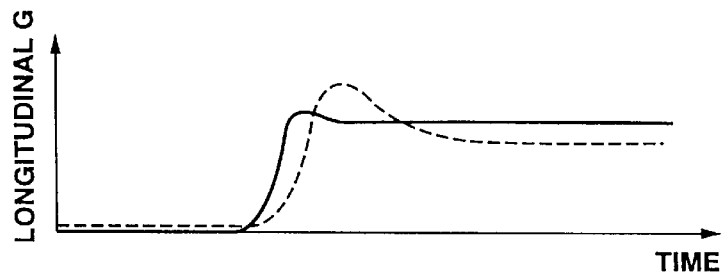

As can be seen from the timing charts (obtained by the system of the embodiment) shown in FIGS. 10A–10C, respectively showing variations in throttle opening TVO, desired transmission ratio (desired pulley ratio), and actual transmission ratio (actual pulley ratio), in the presence of switching from normal mode to linear mode B, switching from linear mode to normal mode, switching from normal mode to linear mode A, switching from linear mode A to linear mode C, and switching from linear mode C to normal mode. See good matching between the two characteristic curves of the desired transmission ratio and the actual transmission ratio. On the other hand, as can be seen from the timing charts shown in FIGS. 11A–11C, respectively showing variations in throttle opening TVO, transmission output speed No (secondary pulley rotational speed), and the longitudinal acceleration exerted on the vehicle. In FIGS. 11A–11C, the solid line indicates test results obtained by the system of the embodiment, whereas the one-dotted line indicates test results obtained by JP4-54371. As can be seen from comparison between the characteristic curves indicated by the solid line (the present invention) and the one-dotted line (JP4-54371), the system of the embodiment is superior to that of JP4-54371, in the response time from a time when the throttle opening begins to rise to a time when vehicle acceleration is actually initiated.

Figure 12:
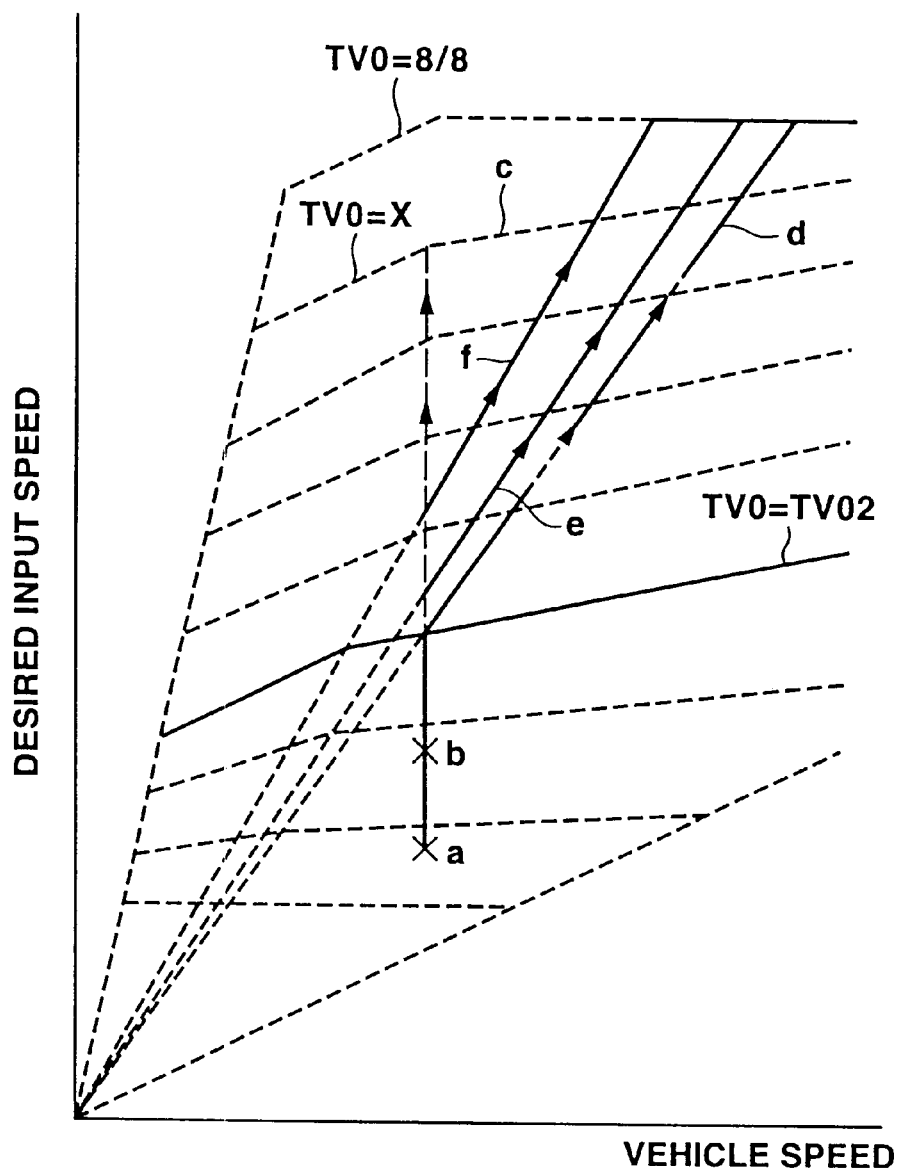
FIG. 12 is an explanatory view showing variations in the transmission ratio based on three different transmission controls, namely JP4-54371, U.S. Pat. No. 4,764,155, and the present invention, obtained when increasing the throttle opening TVO from each of first and second operating conditions a and b.

Referring now to FIG. 12, there is shown the variations in the transmission ratio (the pulley ratio) based on three different transmission controls, that is, JP4-54371 (see the change-speed control characteristic indicated by c), U.S. Pat. No. 4,764,155 (see the change-speed control characteristic indicated by d), and the present invention (see the change-speed control characteristic indicated by e and f). When increasing the throttle opening TVO from each of first and second operating conditions a and b, each contained in the operating condition of a comparatively small throttle opening TVO (<TVO2), up to a predetermined comparatively large throttle opening X, according to the system of JP4-

54371, first, as indicated by c, the desired transmission input speed (the desired primary pulley rotational speed) continues to rise remarkably. In other words, the desired transmission input speed has to be risen for a comparatively long time period, thereby lengthening the change-speed time period. During the automatic shifting, there results in a delay in vehicle acceleration. This deteriorates the response of vehicle acceleration. In contrast to the above, according to the system of U.S. Pat. No. 4,764,155, the change-speed operation ends with a smaller transmission ratio rather than the system of JP4-54371. Thereafter, the running mode is switched to the linear mode, and thus the transmission ratio is fixed. In this case, vehicle acceleration can be rapidly started. However, as can be seen from the characteristic line indicated by d, the transmission ratio fixed when throttle opening TVO increases from first operating condition a and then reaches predetermined throttle opening X, tends to be identical to the transmission ratio fixed when throttle opening TVO increases from second operating condition b and then reaches predetermined throttle opening X. Therefore, when increasing throttle opening TVO from the running condition b having a comparatively higher transmission ratio with respect to the running condition a, there is an increased tendency of insufficient downshifting, in comparison with when increasing throttle opening TVO from the running condition a having a comparatively lower transmission ratio with respect to the running condition b. Thus, acceleration feeling is still insufficient. On the other hand, according to the system of the embodiment, it is possible to select either one of at least three different linear modes A, B, and C, respectively corresponding to the small, medium, and large acceleration requirements. During the linear mode, the desired transmission ratio ($D_{ratio}$) is determined or obtained by adding the transmission ratio (RatioB) used or determined just before the throttle opening begins to increase to the predetermined additional value (Ratioadd) based on the degree of acceleration requirement of the driver (see the flow from step S17 to step S20 of FIG. 9 and the previously-described expression (1)). Thus, when increasing throttle opening TVO from the running condition a having a comparatively lower transmission ratio with respect to the running condition b, the transmission ratio varies as indicated by the characteristic line e. When increasing throttle opening TVO from the running condition b having a comparatively higher transmission ratio with respect to the running condition a, the transmission ratio varies as indicated by the characteristic line f. Therefore, the system of the embodiment can provide proper acceleration feeling even when accelerating from either of slight different running conditions (a, b).

Although the system of the embodiment is exemplified in the conventional pulley-type continuously variable transmission, it will be appreciated that the fundamental concept of the invention is not limited to the particular embodiments shown and described herein. The fundamental concept of the invention may be applied to a toroidal CVT. In the shown embodiment, in order to compute the desired transmission ratio ($D_{ratio}$), add pulley ratio Ratioadd is added to the desired transmission ratio used at the normal mode just before switching to the linear mode. In lieu thereof, the desired transmission ratio $D_{ratio}$ can be obtained by multiplying a preprogrammed or predetermined value by the desired transmission ratio used at the normal mode just before switching to the linear mode. In the shown embodiment, three different linear modes A, B, and C are set. To further enhance the control accuracy, three or more linear modes may be set. In this case, voice outputs have to be further increased.

The entire contents of Japanese Patent Application No. P2000-177994 (filed Jun. 14, 2000) is incorporated herein by reference.

While the foregoing is a description of, the preferred embodiments carried out the invention, it will be understood that the invention is not limited to the particular embodiments shown and described herein, but that various changes and modifications may be made without departing from the scope or spirit of this invention as defined by the following claims:

What is claimed is:

1. A control system for a continuously variable automatic transmission for an automotive vehicle, comprising:
a throttle opening sensor that detects a throttle opening; and
a controller that executes a change-speed control in a normal mode in which a desired transmission input speed is determined based on operating conditions of the vehicle and a desired transmission ratio is determined based on the desired transmission input speed when the throttle opening is less than a first value, and that executes the change-speed control in a linear mode in which the desired transmission ratio is fixed to a second value when the throttle opening is greater than or equal to the first value;
the second value being set based on the desired transmission ratio used in the normal mode prior to switching to the linear mode.

2. The control system as claimed in claim 1, wherein the second value is set at a value obtained by adding a third value to the desired transmission ratio used in the normal mode prior to switching to the linear mode.

3. The control system as claimed in claim 1, wherein the second value is set at a value obtained by multiplying a third value with the desired transmission ratio used in the normal mode prior to switching to the linear mode.

4. The control system as claimed in claim 2, wherein the third value is set to increase, as the throttle opening increases.

5. The control system as claimed in claim 2, wherein the third value is set to increase, as a time rate of increase in the throttle opening increases.

6. The control system as claimed in claim 2, which further comprises a vehicle speed sensor that detects a vehicle speed, and wherein the third value is set to decrease, as the vehicle speed increases.

7. The control system as claimed in claim 1, wherein the desired transmission ratio is set so that a transmission input speed of the continuously variable automatic transmission is limited to below a fourth value.

8. The control system as claimed in claim 1, wherein the continuously variable automatic transmission has a manual mode in which a predetermined range gear is manually selected, and which further comprises a speaker that generates a voice output corresponding to a gear selected during shifting in the manual mode.

9. The control system as claimed in claim 8, wherein the speaker generates a voice output corresponding to at least one of selection of the manual mode and release of the manual mode.

10. The control system as claimed in claim 1, wherein the controller selects one of at least three different linear modes based on the throttle opening and a time rate of increase in the throttle opening, when the throttle opening is greater than or equal to the first value, a first linear mode of the three different linear modes being a mode in which the desired transmission ratio is fixed to a predetermined first value preprogrammed to be suitable for a predetermined first acceleration requirement, a second linear mode of the three different linear modes being a mode in which the desired transmission ratio is fixed to a predetermined second value preprogrammed to be suitable for a predetermined second acceleration requirement higher than the predetermined first acceleration requirement, and a third linear mode of the three different linear modes being a mode in which the desired transmission ratio is fixed to a predetermined third value preprogrammed to be suitable for a predetermined third acceleration requirement higher than the predetermined second acceleration requirement.

11. A control system for a continuously variable automatic transmission for an automotive vehicle, comprising:

means for detecting a throttle opening; and a controller that executes a change-speed control in a normal mode in which a desired transmission input speed is determined based on operating conditions of the vehicle and a desired transmission ratio is determined based on the desired transmission input speed when the throttle opening is less than or equal to a first predetermined throttle opening, and that executes the change-speed control in a first linear mode in which the desired transmission ratio is fixed to a predetermined first value preprogrammed to be suitable for a predetermined first acceleration requirement when the throttle opening is greater than a second predetermined throttle opening and less than or equal to a third predetermined throttle opening and a time rate of increase in the throttle opening is less than or equal to a predetermined time rate of increase, and that executes the change-speed control in a second linear mode in which the desired transmission ratio is fixed to a predetermined second value preprogrammed to be suitable for a predetermined second acceleration requirement higher than the predetermined first acceleration requirement when the throttle opening is greater than the second predetermined throttle opening and less than or equal to the third predetermined throttle opening and the time rate of increase in the throttle opening is greater than the predetermined time rate of increase, and that executes the change-speed control in a third linear mode in which the desired transmission ratio is fixed to a predetermined third value preprogrammed to be suitable for a predetermined third acceleration requirement higher than the predetermined second acceleration requirement when the throttle opening is greater than a fourth predetermined throttle opening, the fourth predetermined throttle opening being greater than the third predetermined throttle opening, the fourth predetermined throttle opening being greater than the third predetermined throttle opening being greater than the second predetermined throttle opening being greater than the first predetermined throttle opening;

each of the predetermined first, second, and third values being set based on the desired transmission ratio used in the normal mode prior to switching to either of the first, second, and third linear modes.

12. The control system as claimed in claim 11, wherein the continuously variable automatic transmission has a manual mode in which a predetermined range gear is manually selected, and which further comprises a voice production means for generating a voice output corresponding to a gear selected during shifting in the manual mode.

13. The control system as claimed in claim 12, wherein the voice production means generates a voice output corresponding to at least one of selection of the manual mode and release of the manual mode.

14. A method for controlling a continuously variable automatic transmission for an automotive vehicle, the method comprising:

detecting a throttle opening;

determining, based on the throttle opening and a time rate of increase in the throttle opening, whether a running mode is a normal mode, a first linear mode, a second linear mode, or a third linear mode;

executing a change-speed control in the normal mode in which a desired transmission input speed is determined based on operating conditions of the vehicle and a desired transmission ratio is determined based on the desired transmission input speed when the throttle opening is less than or equal to a first predetermined throttle opening;

executing the change-speed control in the first linear mode in which the desired transmission ratio is fixed to a predetermined first value preprogrammed to be suitable for a predetermined first acceleration requirement when the throttle opening is greater than a second predetermined throttle opening and less than or equal to a third predetermined throttle opening and the time rate of increase in the throttle opening is less than or equal to a predetermined time rate of increase;

executing the change-speed control in the second linear mode in which the desired transmission ratio is fixed to a predetermined second value preprogrammed to be suitable for a predetermined second acceleration requirement higher than the predetermined first acceleration requirement when the throttle opening is greater than the second predetermined throttle opening and less than or equal to the third predetermined throttle opening and the time rate of increase in the-throttle opening is greater than the predetermined time rate of increase;

executing the change-speed control in the third linear mode in which the desired transmission ratio is fixed to a predetermined third value preprogrammed to be suitable for a predetermined third acceleration requirement higher than the predetermined second acceleration requirement when the throttle opening is greater than a fourth predetermined throttle opening, the fourth predetermined throttle opening being greater than the third predetermined throttle opening, the fourth predetermined throttle opening being greater than the third predetermined throttle opening being greater than the second predetermined throttle opening being greater than the first predetermined throttle opening; and setting each of the predetermined first, second, and third values based on the desired transmission ratio used in the normal mode prior to switching to either of the first, second, and third linear modes.

15. The method as claimed in claim 14, wherein each of the predetermined first, second, and third values is set at a value obtained by adding a controlled variable based on the throttle opening and the time rate of increase in the throttle opening to the desired transmission ratio used in the normal mode prior to switching to either of the first, second, and third linear modes.

16. The method as claimed in claim 15, which further comprises detecting a vehicle speed, and wherein the controlled variable is set to decrease, as the vehicle speed increases.

17. The method as claimed in claim 16, which further comprises limiting a transmission input speed of the continuously variable automatic transmission to below a predetermined value.

18. The method as claimed in claim 17, which further comprises generating a voice output corresponding to a gear selected during shifting in a manual mode, only when the continuously variable automatic transmission has the manual mode in which a predetermined range gear is manually selected.

19. The method as claimed in claim 18, which further comprises generating a voice output corresponding to at least one of selection of the manual mode and release of the manual mode.

* * * * *